United States Patent [19]

Perroud et al.

[11] Patent Number: 4,604,228

[45] Date of Patent: Aug. 5, 1986

[54] CANDOLUMINESCENT MATERIAL AND ITS PREPARATION PROCESS

[75] Inventors: Anne-Marie Perroud, Meylan; Alain Silvent, Grenoble, both of France

[73] Assignee: Commissariat a l'Energie Atomique, Paris, France

[21] Appl. No.: 705,006

[22] Filed: Feb. 25, 1985

[30] Foreign Application Priority Data

Mar. 2, 1984 [FR] France ........................ 84 03304

[51] Int. Cl.[4] .................. F21H 3/00; F21H 1/02; H01M 2/10

[52] U.S. Cl. .................. 252/492; 427/159; 431/100

[58] Field of Search .................. 252/492; 427/159; 431/100

[56] References Cited

U.S. PATENT DOCUMENTS

| | | | |
|---|---|---|---|
| 359,524 | 3/1887 | Von Welsbach | 252/492 |
| 377,700 | 2/1888 | Von Welsbach | 252/492 |
| 399,174 | 3/1889 | Von Welsbach | 252/492 |
| 403,804 | 5/1889 | Von Welsbach | 252/492 |
| 463,470 | 11/1891 | Von Welsbach | 427/159 |
| 563,524 | 7/1896 | Von Welsbach | 252/492 |
| 574,862 | 1/1897 | Van Deth | 252/492 |
| 703,064 | 6/1902 | Hicks | 252/492 |
| 4,532,073 | 7/1985 | Cornu et al. | 427/159 |
| 4,533,317 | 8/1985 | Addison | 431/100 |

FOREIGN PATENT DOCUMENTS

| | | | |
|---|---|---|---|
| 0082062 | 6/1983 | European Pat. Off. | 252/492 |
| 39162 | 9/1885 | Fed. Rep. of Germany . | |
| 41945 | 9/1900 | Fed. Rep. of Germany . | |
| 20740 | of 1898 | United Kingdom . | |
| 3925 | of 1900 | United Kingdom . | |
| 17492 | of 1912 | United Kingdom . | |

*Primary Examiner*—P. E. Konopka

*Attorney, Agent, or Firm*—James E. Nilles

[57] ABSTRACT

Candoluminescent material constituted by a mixture of finely divided oxides brought into the form of a net identical to a textile. This mixture has the following molar compositions:

75 to 90% zirconia, 5 to 20% of yttrium oxide or calcium oxide and yttrium oxide.

2 to 15% of magnesia, or magnesia and alumina, 0.01 to 1% in all of oxides of iron, chrome, manganese, praseodymium and/or cerium.

10 Claims, No Drawings

CANDOLUMINESCENT MATERIAL AND ITS PREPARATION PROCESS

BACKGROUND OF THE INVENTION

The present invention relates to a novel candoluminescent material, which can more particularly be used as a mantle for gas lamps, as well as to the process for producing the same.

Since the work carried out by Auer von Welsbach gas lamp mantles have been formed from a combustible fine fabric impregnates with a mineral which, after the first combustion in the flame of the gas, forms a solid state net giving an intense candoluminescence phenomenon in the flame. The solid net forms rapidly as from the first ignition and acquires its definitive shape and a solid texture, which resists mechanical and thermal shocks. In order to obtain this strength, it is preferable for the solid net to have a fluorine-type cubic crystalline structure. Furthermore, to ensure that the candoluminescent material has a high brightness level in the visible range, it is necessary that it emits little infrared, which makes it possible to reach a high temperature in the virtually colourless flame of the gas.

Previously, the mantles have been formed by a fabric net impregnated with a mixture of salts which, following the first combustion, form a fine and divided fabric of thorium oxide containing a little cerium oxide or other oxides, e.g. an oxide containing 99.2 molar % of thorium oxide and 0.8 molar % of cerium oxide.

However, there are a certain number of disadvantages in the use and production of thorium oxide-base mantles. Thus, thorium is a naturally alpha emitting radioactive element having a half-life of $1.4 \cdot 10^{10}$ years and by relationship gives various radioactive isotopes, which are short-life gamma, beta or alpha emitters, including a radioactive gas thoron 220 leading to lead 208. Thus, one tonne of natural thorium represents approximately one curie of $^{232}Th$ and one curie of $^{228}Th$. However, the thorium quantities used for the production of mantles are by no means negligible because, according to world statistics, the production of candoluminescent mantles is approximately 300 million per annum. Thus, at a rate of 0.3 g of thorium per mantle, the thorium quantity involved in 100 tonnes per annum, which leads to a dangerous and regrettable dissemination of thorium.

To obviate this disadvantage, recently novel candoluminescent materials have been proposed, which are based on mixtures of zirconium and calcium oxides, cf French Patent application 8,123,202 of Dec. 11, 1981 in the name of the Applicant and entitled "Candoluminescent material, its preparation process and its use as a gas mantle".

A typical composition of such materials described in this French Patent is in accordance with the following molar composition:

75 to 90% of zirconium oxide,
10 to 25% of calcium oxide,
0 to 5% of aluminum oxide and/or magnesium oxide,
0 to 1% in all of iron, manganese, praseodymium and/or cerium oxides.

These compositions are solid solutions having good mechanical properties with regards to their stability in the flame, their resistance to mechanical and thermal shocks and which can irradiate an appropriate luminous energy because, measured in incandescence temperature with the optical pyrometer, it is of the same level as that supplied by the prior art thoria-based compositions.

However, on measuring said luminous energy of the thus obtained mantles according to the lighting technology method, i.e. using a light meter, the figures obtained are below those of commercially available thoria-based mantles.

Mantles formed from zirconium oxide and oxides or rare earths are also known. Thus, German Pat. No. 39,162 describes a candoluminescent material containing approximately 64 molar % of zirconium oxide and approximately 35 molar % of oxides of rare earths, constituted by yttrium and lanthanum.

These high contents of rare earths lower the incandescence temperature and lead to a low luminosity. Thus, in example 2 of this German Patent, the luminosity is below 10 lux.

German Pat. No. 41,945 discloses candoluminescent materials with a molar composition of 25.7% cerium oxide, 16.9% lanthanum oxide, 12.2% yttrium oxide and 45.2% zirconium oxide.

Thus, these mantles contain approximately 55 molar % of rare earths (cerium, lanthanum, yttrium) and have a reddish luminosity well below 5 lux.

Thus, the luminosity of such mantles is inadequate.

The Applicant has therefore continued research in order to attempt to improve the luminosity of zirconium mantles, by defining said luminosity as the magnitude measured by an optical cell, whose sensitivity is representative of that of the human eye.

Thus, among the possible means for improving the light emmission of the prior art candoluminescent refractory compounds, the Applicant investigated novel addition elements based on cubic zirconia, which formed the essential constituent nucleus of the previously developed materials. In this connection, the Applicant's attention was drawn to yttrium, which is known as a cubic zirconia stabilizer and is frequently used for this purpose in molecular proportions roughly the same as those of the solid zirconia/calcium oxide solution. However, mantles obtained on the basis of zirconium/yttrium solutions, although having excellent mechanical properties, have an incandescent radiation in the visible spectrum which is below that of lime-stabilized zirconia mantles. For comparison and all things being equal, it was found that this incandescent radiation was on average 10 lux in the case of a zirconia/yttrium oxide solution. This would appear to make the Expert abandon the use of yttrium for producing candoluminescent solid solutions.

However, in the prior art compositions forming the subject matter of French specification 8,123,202 there are a certain number of magnesium compositions in oxide form having a good luminous energy efficiency, but suffering from the major disadvantage of an embrittlement of the mantle when the magnesia content of the solid solution exceeded 4 to 5% of the molar composition. Thus, for purely mechanical reasons, it would appear to be impossible to further increase the candoluminescent efficiency of compositions obtained by introducing more magnesia into the solid zirconia solution.

However, the Applicant has unexpectedly found that on gradually replacing part of the lime in the prior art compositions by an yttrium oxide fraction, whilst introducing ever increasing quantities of magnesia, the luminosity of the compound was increased, without decreasing its strength, stability and mechanical properties.

In other words, the Applicant has revealed that the use of yttrium oxide, combined or not combined with lime, in a solid candoluminescent composition, makes it possible to considerably increase the magnesia content, thus increasing the strength and stability of the material as well as its luminosity. Thus, according to the invention, it is possible to introduce up to 15 molar % of magnesia.

SUMMARY OF THE INVENTION

Thus, a typical molar composition of the candoluminescent materials according to the invention consists of 75 to 90% zirconia, 5 to 20% yttrium oxide, or yttrium oxide and calcium oxide, 2 to 15% of magnesia or magnesia and alumina, as well as 0.01 to 1% in all of one or more oxides chosen from the group iron, chrome, manganese, praseodymium and cerium.

Thus, the invention essentially consists of replacing, in the compounds according to French specification 8,123,202, all or part of the lime by yttrium oxide. The addition of this yttrium oxide makes it possible to include up to 15% of magnesia, which was impossible when using calcium oxide only.

The invention also relates to a process for preparing a candoluminescent material according to the aforementioned characteristics and which comprises: impregnating a combustible textile material with a solution of zirconium, calcium and/or yttrium, aluminium and/or magnesium salts, as well as one or more salts chosen from the group including iron, manganese, praseodymium, chrome and cerium, the concentration of the salts in the impregnation solution being such that it corresponds to obtaining a mixture of oxides having the following molar composition:

75 to 90% zirconia, 5 to 20% of yttrium oxide or calcium oxide and yttrium oxide, 2 to 15% of magnesia, or magnesia and alumina, 0.01 to 1% in all of oxides of iron, chrome, manganese, praseodymium and/or cerium, subjecting the thus impregnated textile to a combustion process in order to eliminate the textile and convert the salts into oxides distributed in the form of a net substantially corresponding to the original textile material.

The solutions used for producing the mantles according to the invention are of the same nature as those described in the aforementioned French specification 8,123,202 of 11.12.1981. With regards to the yttrium solution, it is possible to use a molar solution by weight of yttrium nitrate $Y(NO_3)_3$, $8OH_2$ with 419 g/kg of solution. The way in which the mantle is produced is the same as that described in the aforementioned specification, after performing the denitration operations, which are well known to mantle manufacturers.

For example, the aerated fabric for producing the mantle is immersed in 100 g of solution containing:

in the first example:

82 g of molar solution by weight of Zr nitrate 5 g of molar solution by weight of Y nitrate 12 g of molar solution by weight of Mg nitrate 1 g of molar solution by weight of Ce and Fe nitrate;

in the second example:

87 g of molar solution by weight of Zr nitrate 4 g of molar solution by weight of Y nitrate 2 g of molar solution by weight of Ca nitrate 6 g of molar solution by weight of Mg nitrate 1 g of molar solution by weight of Ce and Fe nitrate.

After undergoing the aforementioned conventional treatments, the fabric is brought into the form of a mantle adapted to the type of lamp used. The mantle initially wears away by ignition and becomes incandescent with the flame of the gas. Its illumination at a given gas pressure is then measured with the aid of a calibrated light meter.

The following table gives in comparative form a luminous energy and the mean incandescence temperatures in degrees Centigrade, so that it is possible to compare the characteristics and performances of the prior art thoria mantles and the candoluminescent mantles of zirconia in solid solutions with the different oxides of calcium, aluminium, magnesium and yttrium. The table shows that the solid solutions of oxides according to the invention, i.e. containing both a quantity of up to 15% of magnesia and a mixture of yttrium and calcium oxides, which give the best luminosity efficiencies, without any deterioration to the purely mechanical strength characteristics.

COMPARATIVE TABLE OF THE LUMINOUS ENERGIES OF A SELECTION OF SOLID SOLUTIONS[(1)]

| | | | | Mean incandescence temperature in °C. | Mean luminosity in lux |
|---|---|---|---|---|---|
| Zirconia with oxides | | | | | |
| Ca | Al | Mg | | 1,595 | 36 |
| (16%) | (2%) | (2%) | | 1,590 | 35 |
| | | | | 1,575 | 35 |
| Zirconia with oxides | | | | | |
| Y | MG | Ce + Fe | | 1,610 | 37 |
| (5%) | (12%) | (1%) | | 1,600 | 37.5 |
| Zirconia with oxides | | | | | |
| Y | Ca | Mg | Ce + Fe | 1,640 | 45 |
| (4%) | (2%) | (5%) | (1%) | 1,635 | 43 |
| | | | | 1,620 | 38 |
| Commercial mantles with | | | | 1,650 | 45 |
| $ThO_2$ | | | | 1,640 | 39 |
| | | | | 1,635 | 40 |

[(1)]Each result referred to in this table is the mean result of five tests.

During combustion, the anions of the salts are progressively eliminated and the metals are organised in the state of oxides, in accordance with a fluorine-type, cubic crystalline texture, whilst approximately reproducing the shape assumed by the fibres of the fabric towards the end of their combustion.

The combustible textile used can be a textile based on cotton, rayon, acetate or other natural or artificial fibres, such as those generally used for producing candoluminescent mantles.

The textile can be in the form of a canvas, gauze tulle, voile, etc. The best results are obtained with highly aerated fabrics, because the textiles generally burn with significant shrinkage. In addition, a highly aerated fabric is better than a canvas, because the mineral structure can be put into place much more easily and the mantle has a better strength. Moreover, it is preferable for the fabric weaving filaments to be constituted by bundles of extremely fine filaments, rather than strands. Thus, after conversion into oxide filaments, the extremely fine filaments are less good heat conductors and lose less energy by conduction.

The solutions used for impregnation can be aqueous or organic solutions, e.g. alcoholic solutions. In the same way, the salts used can be salts coming from a mineral or organic acid, or alkoxides. Preference is given to the use of aqueous solutions, because it has been found that the mechanical strength of mantles obtained was better in this case. This is doubtless due to the fact that a better impregnation of the cellulose fabric is obtained with these solutions, because cellulose fabrics do not have a great affinity for organic products.

Therefore, a good impregnation homogeneity is not obtained and the mechanical strength of the mantle obtained after combustion of the textile is inferior.

In the same way, it is preferable to use as salts of zirconium, calcium, yttrium, aluminium, magnesium, iron, chrome, praseodymium, manganese and cerium, salts of mineral acids in order to obtain impregnation homogeneity and easy conversion into oxides.

Although different mineral acid salts can be used, reference is given to nitrates, because they have the advantage of easily decomposing into oxides and of being suitable for the preparation of solutions having adequate salt concentrations.

Thus, although cellulose-based textiles fix a large amount of solution, it is necessary to have a high salts concentration so that, after textile combustion the mantle has an adequate quantity of residual oxides, thus constituting a strong structure.

According to the invention, it is also possible to add various additives to the solution, particularly to improve the wettability of the fabric, the flexibility or the preserving thereof, in the same way as was generally carried out in the case of thoria mantles.

When the process according to the invention is used for the production of gas mantles, the impregnated mantles undergo drying and then preservation treatment in the dry state, as in the case of thoria-based mantles.

What is claimed is:

1. A candoluminescent material comprising a mixture of finely divided oxides brought into the form of a net identical to a textile, wherein the molar composition of the oxide mixture is 75 to 90% zirconia, 5 to 20% yttrium oxide or calcium and yttrium oxides, 2 to 15% magnesia or magnesia and alumina, and 0.01 to 1% of one or more oxides selected from the group consisting of iron, manganese, praseodymium and cerium, and wherein when alumina is present, the amount of magnesia is at least 2%, and when calcium oxide is present, the amount of yttrium oxide is at least 4%.

2. The candoluminescent material of claim 1, wherein the molar composition of said oxide mixture is 75–90% zirconia, 5% yttrium oxide, 12% magnesia and 1% of a mixture of oxides of iron and cerium.

3. The candoluminescent material of claim 1, wherein the molar composition of said oxide mixture is 75–90% zirconia, 4% yttrium oxide, 2% calcium oxide, 5% magnesia and 1% of a mixture of oxides of iron and cerium.

4. A process for the preparation of a candoluminescent material, comprising: impregnating a combustible textile material with a solution of zirconium, calcium or yttrium or a mixture thereof, aluminum or magnesium salts or a mixture thereof and one or more salts selected from the group consisting of iron, manganese, praseodymium, chromium and cerium, the concentration of the salts in the impregnation solution being such that it corresponds to obtaining a mixture of oxides having the following molar composition: 75 to 90% zirconia, 5 to 20% of yttrium oxide or calcium oxide and yttrium oxide, 2 to 15% of magnesia, or magnesia and alumina, and 0.01 to 1% of one or more oxides of iron, chromium, manganese, praseodymium and cerium, and subjecting the thus impregnated textile to combustion in order to eliminate the textile, thereby converting the salts into oxides distributed in the form of a net substantially corresponding to the original textile material.

5. The process of claim 4, wherein the concentration of the salts in the impregnation solution are such that it corresponds to obtaining a mixture of oxides having the following molar composition: 75–90% zirconia, 5% yttrium oxide, 12% magnesia and 1% of a mixture of oxides of iron and cerium.

6. The process of claim 4, wherein the concentration of the salts in the impregnation solution are such that it corresponds to obtaining a mixture of oxides having the following molar composition: 75–90% zirconia, 4% yttrium oxide, 2% calcium oxide, 5% magnesia and 1% of a mixture of oxides of iron and cerium.

7. The process of claim 4, wherein the salts used for impregnating combustible textile material are salts of mineral acids, organic acids or are alkoxides.

8. The process of claim 7, wherein the salts used are salts of mineral acids.

9. The process of claim 8, wherein the salts used are nitrates.

10. The process of claim 4, wherein the salt solution is an aqueous solution or an alcoholic solution.

* * * * *